(12) United States Patent
Eliasson et al.

(10) Patent No.: US 6,491,231 B1
(45) Date of Patent: Dec. 10, 2002

(54) METHOD TO MAKE SNOW FOR INSECT CONTROL AND DEVICE FOR MAKING THE SAME

(75) Inventors: Bertil Eliasson, Vallda (SE); Per-Åke Hallberg, Sävedalen (SE)

(73) Assignee: Sinterkil AB, Savedalen (SE)

( * ) Notice: Subject to any disclaimer, the term of this patent is extended or adjusted under 35 U.S.C. 154(b) by 0 days.

(21) Appl. No.: 09/720,527

(22) PCT Filed: Jul. 9, 1999

(86) PCT No.: PCT/SE99/01245

§ 371 (c)(1),
(2), (4) Date: Dec. 20, 2000

(87) PCT Pub. No.: WO00/02446

PCT Pub. Date: Jan. 20, 2000

(30) Foreign Application Priority Data

Jul. 10, 1998 (SE) ................................................ 9802499
Oct. 16, 1998 (SE) ................................................ 9803530

(51) Int. Cl.[7] ............................................................ B05B 17/00
(52) U.S. Cl. .................................................. 239/1; 239/589
(58) Field of Search .............................. 239/1, 2.1, 2.2, 239/14.1, 14.2, 589; 43/124, 125, 132.1; 119/602–605, 650–652, 655, 672, 677

(56) References Cited

U.S. PATENT DOCUMENTS 4,200,656 A * 4/1980 Cohen et al. .................. 422/32
4,413,756 A   11/1983 Kirley ...................... 222/402.11
4,793,554 A   12/1988 Kraus et al. .................. 239/2.2
5,678,352 A * 10/1997 Leitner et al. ................. 43/124

FOREIGN PATENT DOCUMENTS

| EP | 882522 A1 | * 12/1998 | |
| EP | 0891945 | 1/1999 | ............ C01B/31/22 |
| WO | 9419655 | 9/1994 | ............. F25C/3/04 |

* cited by examiner

Primary Examiner—Lesley D. Morris
(74) Attorney, Agent, or Firm—Orum & Roth

(57) ABSTRACT

The invention relates to a method for bringing about the transformation of a medium such as carbon dioxide or other gases or mixtures thereof into snow. In accordance with the invention, the aforementioned medium and the snow produced from it are caused to interact with surfaces of a snow-producing nozzle extending from a discharge orifice for the medium. The aforementioned medium, after exiting from the discharge orifice, is either permitted to expand into an elongated space which exhibits a uniform cross section. Or the medium is also permitted to act against a number of obstructions in the form of flexible bristles situated along the flow path of the medium as it flows out between the discharge orifice for the medium and an outlet for the formed snow. The produced carbon dioxide snow is intended for use in small animal pest decontamination. Means for producing snow are included in the invention.

9 Claims, 2 Drawing Sheets

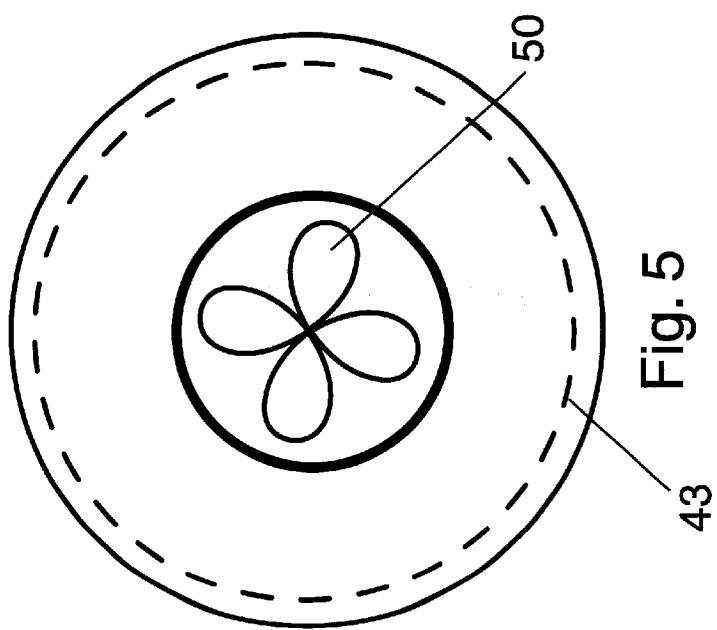
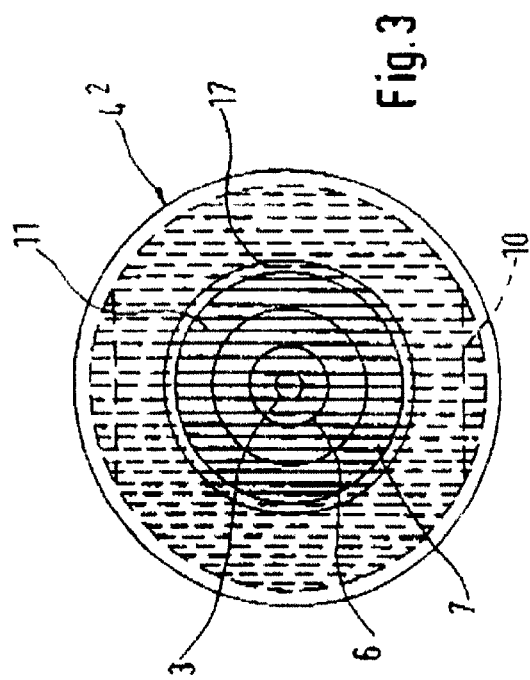
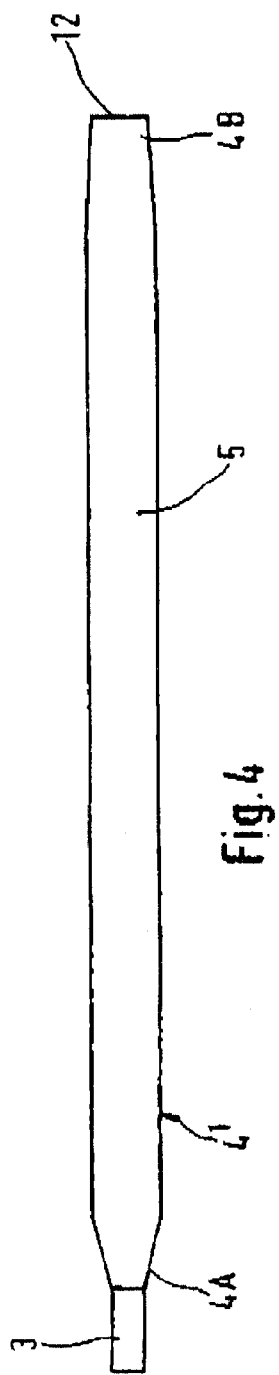

METHOD TO MAKE SNOW FOR INSECT CONTROL AND DEVICE FOR MAKING THE SAME

The present invention relates to a method for bringing about the transformation of a medium such as carbon dioxide or other gases or mixtures thereof into snow.

When using carbon dioxide ($CO_2$) or other gases or mixtures thereof for the purpose of being able effectively to cool surfaces and other spaces of varying size and nature, for example in order to kill harmful insects or other undesirable animals, it is important to be able to achieve a low temperature rapidly and effectively and to minimize the quantity of gas used. Previously disclosed methods, in which existing snow tubes are used, have not proved to be so effective, and an unacceptable cooling effect has accordingly been achieved. See, for example, U.S. Pat. Nos. 4,911,362; 5,027,546 and 5,349,778. In order to cool surfaces and spaces effectively so that harmful insects and other undesirable animals are cooled rapidly to kill them, it is necessary for the largest possible proportion of the gas used to be converted into snow, which, at the time of spraying, exhibits a low temperature, a good adhesive capacity and a high ability to cover the surfaces in question so that the insects are killed effectively.

The principal object of the present invention is thus, in the first instance, to identify a method which effectively solves the aforementioned problems efficiently and simply.

The aforementioned principal object is achieved by means of a method in accordance with the present invention, which is characterized essentially in that, for the purpose of being able effectively to cool surfaces and different spaces of varying size and nature in order to kill harmful insects or other undesirable animals, the aforementioned medium and the snow produced from it are caused to interact with the surfaces of a snow-producing nozzle extending from a discharge orifice for the medium, in that the aforementioned medium, after exiting from the discharge orifice, is permitted either to expand into an elongated space which exhibits a uniform cross section, or to act against a number of obstructions situated along the flow path of the medium as it flows out between the discharge orifice for the medium and an outlet for the formed snow, in conjunction with which the produced carbon dioxide snow is intended for the purpose of animal pest decontamination.

There are no previously disclosed means which permit the aforementioned desired object to be achieved, and use is made of snow tubes, which are seen to be not so effective from the patents referred to above, for example.

U.S. 4413756A presents insect control with snow formed by spraying through spaces whose width, and thus their volume, vary.

EP 0 891 945 A2 presents a snow spray nozzle which is formed by an obstruction in the form of a metal disc. This component is already present at the start of spraying of the medium in liquid form and accordingly only one side of it is in contact with the liquid phase, as distinct from bristles, which thus function in a different way in the snow forming process.

A further object of the present invention is thus also to identify means that are suitable for use in the performance of a method in accordance with the present invention and are intended primarily for use in animal pest decontamination.

The aforementioned further object is achieved by means in accordance with the present invention, which is characterized essentially in that a snow-producing nozzle comprises an orifice for the supply of medium at its inlet end, and in that a subsequent elongated space leading from it exhibits a uniform cross section, or in that a number of obstructions for the medium as it flows through are situated in the interior of the nozzle between the orifice for the discharge of the medium to the nozzle and the snow outlet from the nozzle.

The invention is described in detail below, in conjunction with which reference is made to the accompanying drawings, in which:

FIG. 3 shows a cross section through the aforementioned nozzle viewed along the line III—III in FIG. 2; and FIG. 4 shows a third illustrative example of a nozzle viewed from the side.

FIG. 5 illustrates a rotating device obstruction viewed from one end of the nozzle.

Figure 1:
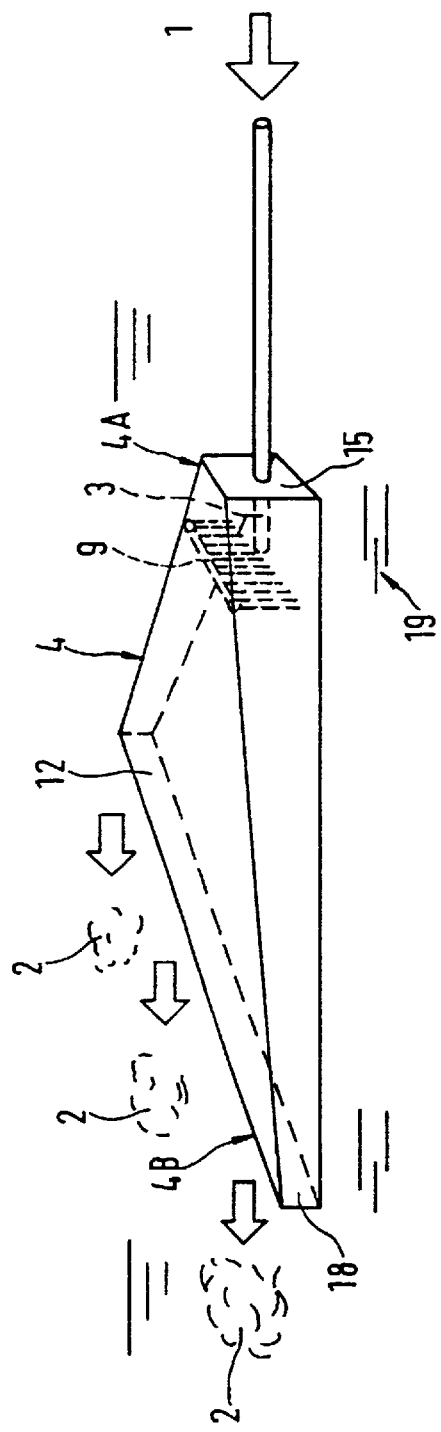
FIG. 1 shows in schematic form a first proposed illustrative example of a nozzle in accordance with the invention viewed in perspective and partially sectioned.

The invention, which now permits effective insect pest decontamination without the use of dangerous poisons and other undesirable substances, is based on the principle of cooling intended areas that it is wished to decontaminate with carbon dioxide snow which exhibits a very low temperature, in the first instance in the food industry and in other areas of activity, such as bakeries and restaurants.

Traditional animal pest decontamination involves the use of poisons in the first instance. This type of decontamination has many disadvantages. Traditional poisons are expensive, require careful cleaning and cause lengthy operating shutdowns, which together result in costly decontamination. The poisons create an unsafe working environment and pose the risk of contamination of foodstuffs. Confined spaces are often difficult or impossible to treat. Increasingly stringent environmental requirements from the authorities and competitive advantages associated with environmental certification, when combined with the aforementioned disadvantages, create a major need for new methods of decontamination.

It has emerged from investigations carried out at the University of Arhus (Skytte, T., 1993) that rapid cooling is an effective way of killing insects. Trials of the invention have been conducted in secret involving decontamination with a first prototype in areas which were previously on the whole impossible to decontaminate by conventional means. Subsequent checks have now revealed the result to be the one hundred percent elimination of insect pests.

It emerged in the course of practical trials with a new prototype that the cooling of a test surface is increased from the $-27°$ C. achieved with a conventional snow tube to $-58°$ C., using the same quantity of gas. This new method also provides an opportunity to direct and distribute the carbon dioxide snow onto the surface or into the area that it is wished to cool.

Decontamination equipment should contain approx. 5 kg of gas in order to be manageable. This quantity of gas is equivalent to the carbon dioxide exhaled by seven persons over a 24-hour period or produced by a car that is driven for approx. 20 kilometres. Five kg of gas in an airtight room with dimensions of 10 m×10 m×3 m will increase the gas concentration from the natural level of 0.03% to approx. 1%. Its concentration should not exceed the concentration of the exhaled air, i.e. 4%. The method is thus non-toxic and environmentally friendly. Carbon dioxide is very inexpensive, furthermore, and carbon dioxide is collected as a by-product of processing industry. The equipment can be fitted with some form of carbon dioxide detector. Other alternative gases or mixtures thereof can also be considered for the aforementioned purpose. Apart from portable equipment, consideration can also be given to permanent installations in critical areas.

In the course of experiments conducted in order to demonstrate cooling effects with different methods, it emerged that the cooling effect of the gas being used increases dramatically if it is possible to ensure that the largest possible proportion of the gas that is used forms carbon dioxide snow with the appropriate characteristics. This is possible by causing the gas and the snow produced from it to interact with surfaces. This affects the quantity and quality of the snow. The larger the area with which the emerging carbon dioxide is permitted to interact, the greater is the yield of snow produced. Trials have also shown that snow formation increases if the emerging carbon dioxide is allowed to interact with snow that has already been formed. Temperatures below –78° C. were achieved when the snow was allowed to flow into a narrow channel after snow formation. This drop in temperature is achieved through the associated increased velocity and the resulting drop in temperature.

A series of trials demonstrated that this method functioned very well when the cooling effect of a nozzle on a surface was measured over a certain period. The trial conditions were kept constant. The fitment of a curtain approx. 8 mm thick (see FIG. 1) consisting of simple bristles of the painter's brush type produces an instantaneous increase in the cooling effect from –15° C. to –58° C.

The method described above (see FIG. 2) was developed in a second series of trials. A significantly greater cooling effect and snow with good adhesion characteristics were achieved.

The method that it is wished to patent consists of first permitting the fluid flowing from a gas cylinder, for example, after it has emerged from one or more discharge orifices, to expand inside one or more small chambers. The next space has a greater volume, which increases the opportunity for small particles of snow to agglomerate into larger particles on the surfaces provided for the purpose. These surfaces also give rise to an accumulation of snow, which further increases the cooling effect of the device. The surfaces may have different appearances and may exhibit a varying degree of flexibility. The supplied medium may also be led through or past obstructions, which may consist of hairs, such as those of a painter's brush, thin strips, a rotating device, tubes or some other arrangement. The material of these obstructions can be selected to give the desired characteristics. They are preferably also flexible.

As a first application, a portable apparatus will be designed for the environmentally friendly control of insect pests. This apparatus can be executed so that it is ergonomically portable and with a pistol grip for regulation of the gas flow.

It will then be necessary to provide the ability to direct the carbon dioxide snow and distribute it on the surface or into the space that it is wished to cool.

Bristles or some other obstruction can also be used to control the flow of snow particles. This is an important aspect, in view of the importance of achieving spherical distribution in certain confined spaces. In the example illustrated in FIG. 1, the particles are directed at the measuring surface of the bristles. The aforementioned bristles may also have a mechanical effect, for example in conjunction with the decontamination of insect pests, when any impurities can be brushed away in conjunction with the decontamination.

More specifically, the invention relates to a method of bringing about the transformation of a medium 1 such as carbon dioxide or other gases or mixtures thereof into snow 2. The aforementioned medium 1 and the snow 2 formed from it are then allowed to interact with surfaces on a snow-producing nozzle 4 extending away from a discharge orifice 3 for the medium 1. The aforementioned medium 1 can then be permitted, after exiting from the discharge orifice 3 in a nozzle $4^1$, to expand inside an elongated space 5 which exhibits a uniform cross section, as illustrated in FIG. 4.

As a further alternative, it is also possible to permit the medium 1 flowing out to the nozzle 4 to act against a number of obstructions 9; 10, 11, which are situated along the flow path of the outflowing medium 1 between the discharge orifice 3 for the medium 1 in the nozzle 4, $4^2$ in question and an outlet 12 for the formed snow, in conjunction with which the produced carbon dioxide snow 2 is intended for the decontamination of animal pests.

The formed snow 2 should preferably be allowed to flow into a narrow, elongated channel after the snow has formed, in conjunction with which the temperature of the aforementioned snow 2 is lowered further. The outflowing medium 1 can also be allowed to interact with snow 2 that has already formed in order to bring about its effective cooling.

Figure 2:
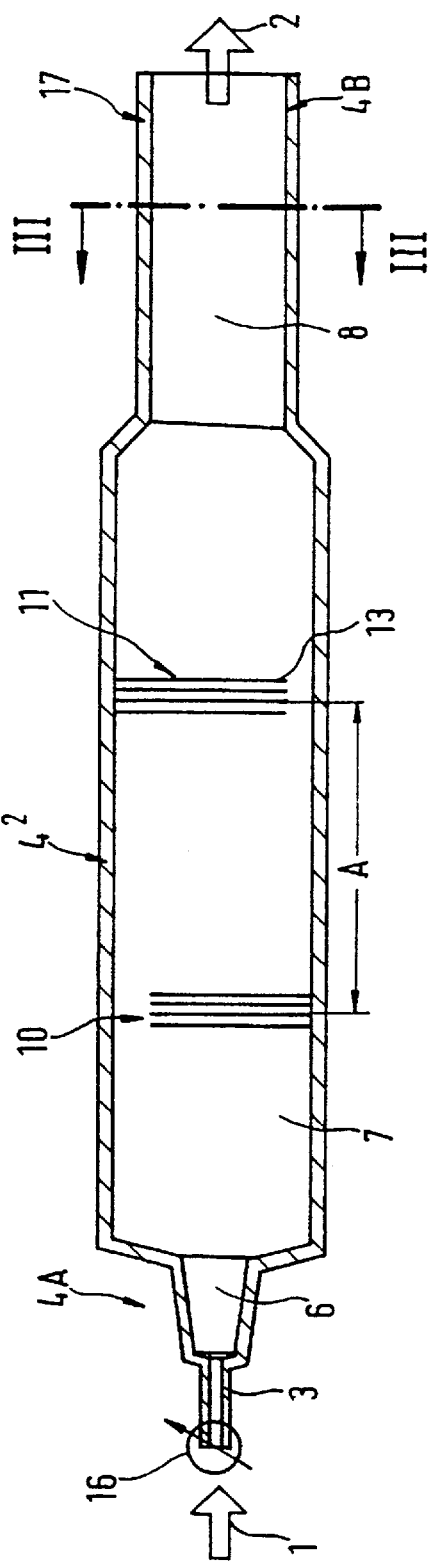
FIG. 2 shows a second illustrative example of a nozzle viewed in cross section in its longitudinal extent.

Illustrated in FIG. 2 is a nozzle $4^2$, in which the medium 1, which flows out through a control valve 16 at one end 4A of the nozzle and into a number of chambers 6, 7 in the nozzle $4^2$, in which the space increases from a previous chamber 6 to a following chamber 7, is caused to expand. At the rear end 4A of the nozzle $4^2$, the outflowing medium 1 is caused to expand inside a chamber 6, which exhibits a successively increasing volume, for example by the chamber 6 exhibiting conical form. A narrower discharge tube 17 is present at the front end 4B of the nozzle $4^2$.

In the embodiments in accordance with FIGS. 1 and 2, the outflowing medium 1 is caused to pass obstructions in the form of an accumulation of hairs 13, for example like the bristles of a painter's brush, in a single execution 9 or a double execution 10, 11 fixed at a mutual distance A from one another. The medium 1 can also be caused to pass obstructions in the form of thin strips, not illustrated here, or in the form of a tube or a rotating obstruction which effectively brings about the aforementioned transformation of the snow.

A means for achieving the aforementioned effective transformation of a medium 1 in the form of carbon dioxide, other gases or mixtures thereof into snow 2, which is intended to be used for the decontamination of vermin and other undesirable animal pests, comprises a snow-producing nozzle 4, $4^1$, $4^2$. This nozzle comprises an orifice 3 for the supply of the aforementioned medium 1 at the inlet end 4A of the nozzle. The design of the nozzle 4, $4^1$, $4^2$ can also vary as follows. The aforementioned nozzle $4^1$ can exhibit an elongated narrow space 5 leading from it, which exhibits a uniform cross section, or the nozzle $4^2$ can exhibit several spaces or chambers 6, 7, 8 located one after the other, which exhibit varying volume. The aforementioned spaces or chambers 5; 6–8 extend towards the discharge end 4B of the nozzle.

Variants of the nozzle 4, $4^2$ are also possible, in which a number of obstructions 9; 10, 11 for the medium 1 as it flows through are situated in the interior of the nozzle between its aforementioned inlet orifice 3 for the medium 1 and the nozzle's discharge orifice 12 for snow 2.

The aforementioned obstruction 9; 10, 11 in the nozzle can be in the form of a number of layers of flexible bristles 13 arranged more or less transversely and/or longitudinally, similar to the bristles of a paint brush, a brush or a broom, which permit the medium 1 to pass straight through the layer of bristles or along the bristles at the same time as snow 2 is being formed.

FIG. 5 illustrates the rotating device embodiment of the obstruction as element 50.

The equipment is executed ergonomically with a pistol grip for regulating the gas flow, and FIG. 1 shows an embodiment with an appropriate design of one of the nozzles 4, which has been subjected to practical testing and is referred to in the text above. Advantage is taken of the aerodynamic effect by keeping the areas 15 and 18 on the front edge 4B and the rear edge 4A of the nozzle the same size, which means that the nozzle 4 is caused to be forced against the substrate 19 along which it is working.

The invention is not restricted to the illustrative embodiments described above and shown in the drawings, but may be modified within the scope of the Patent Claims without departing from the idea of invention.

What is claimed is:

1. A method for transforming a material into snow, comprising the steps of:

interacting the material and the snow with surfaces of a snow producing nozzle which extends from a material discharge orifice, contacting the material against hairlike obstructions, thin strip obstructions, or rotating device obstructions disposed in a material flow path between the material discharge orifice and a snow outlet, wherein the snow is utilized for pest decontamination.

2. A method according to claim 1, wherein the snow is formed utilizing carbon dioxide.

3. A method according to claim 1, further comprising the step of interacting outflowing material with formed snow.

4. A method according to claim 1, further comprising the step of flowing the formed snow into a narrow elongated channel and then further lowering the temperature of the snow.

5. A method according to claim 1, wherein the hairlike obstructions are hair layers similar to hairs in a paint brush.

6. A method according to claim 5, which comprises utilizing a snow producing nozzle having a material supply orifice at an inlet end, and a snow outlet nozzle at another end, the obstructions being disposed in an interior region of the nozzle between the orifice and the nozzle, in a flow path of the material such that the material flows through or along hairs of the hairlike obstruction.

7. A method according to claim 1, wherein the hairlike obstructions are a plurality of layers of transverse bristles.

8. A method according to claim 6, wherein the hairlike obstructions are flexible.

9. A method according to claim 7, wherein the bristles are elongated.

* * * * *